UNITED STATES PATENT OFFICE.

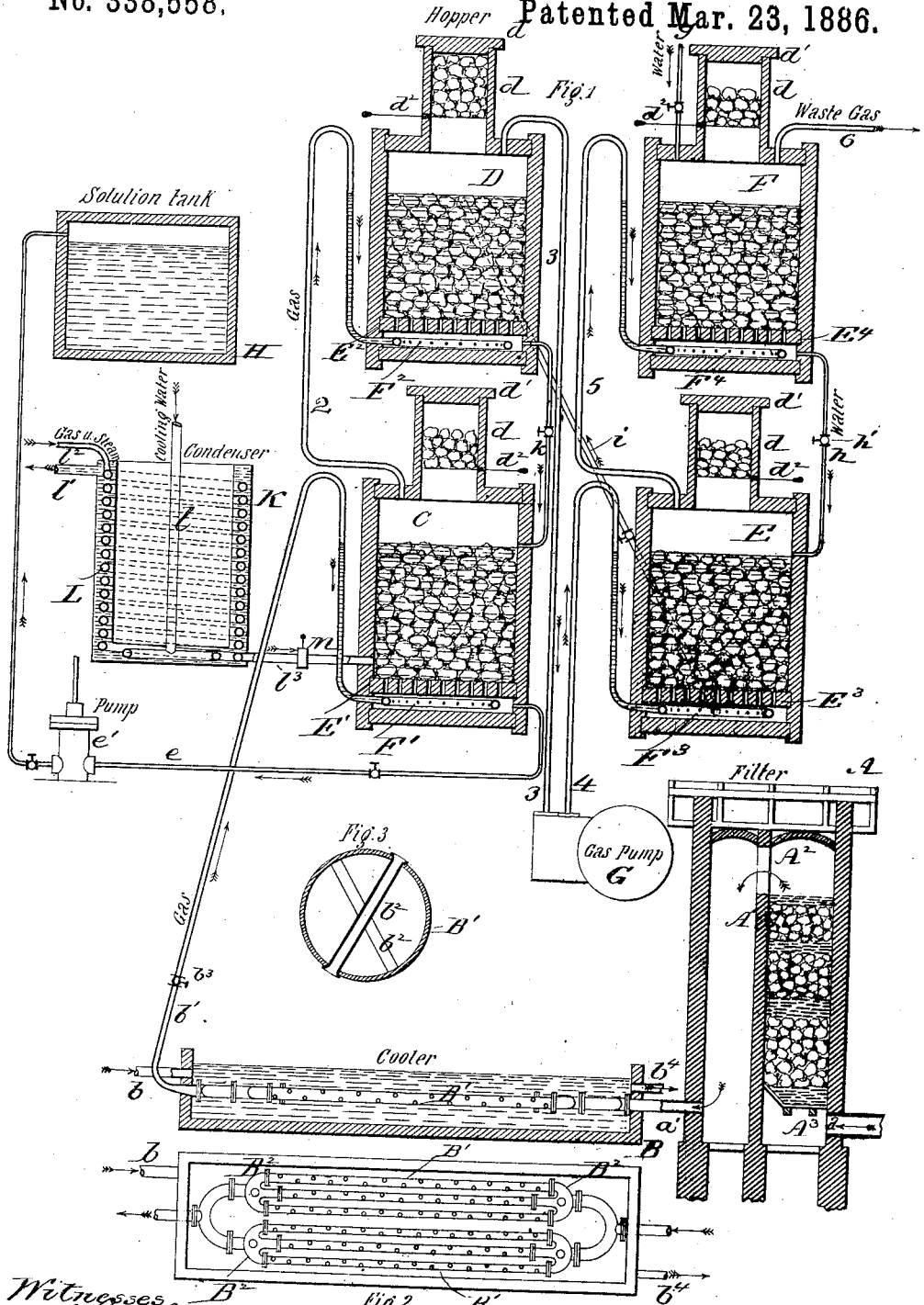

EUGEN BARON RITTER AND CHARLES KELLNER, OF GOERZ, AUSTRIA-HUNGARY, ASSIGNORS TO WILLIAM A. RUSSELL, TRUSTEE, OF LAWRENCE, MASSACHUSETTS.

PROCESS OF MANUFACTURING SULPHITES.

SPECIFICATION forming part of Letters Patent No. 338,558, dated March 23, 1886.

Application filed March 2, 1885. Serial No. 157,520½. (No model.)

*To all whom it may concern:*

Be it known that we, EUGEN BARON RITTER and CHARLES KELLNER, subjects of the Emperor of Austria-Hungary, and residents of Goerz, in the Empire of Austria-Hungary, have invented certain new and useful Improvements in Processes of Manufacturing Sulphites, of which the following is a specification.

This invention has relation to the manufacture of sulphites, and has for its object the provision of a novel process, whereby sulphites are formed continuously and simultaneously with the production of the pure sulphurous acid, which combines with the desired bases.

In an application of even date herewith we have described several of the processes ordinarily employed for the production of these solutions, and have described at length the apparatus by means of which the present process is best carried out, and in Letters Patent of the United States, granted to us the 27th day of October, 1885, No. 329,216, we have described and claimed a process for producing a solution of bisulphites, wherein the solution of sulphurous acid and water is brought into contact successively with the bases respectively contained in separate chambers.

In the process which we are about to describe, and which forms the subject-matter of our present invention, several distinct steps are taken, and each of these steps, it may be remarked, is in itself a novel and useful improvement in the general process of treating and purifying sulphurous acid without regard to the uses to which such acid may be put, the process in its entirety, however, consisting in the combining of the successive steps for the attainment of a certain definite result.

The process as a whole is adapted for the continuous production of sulphurous-acid solutions or salts in a more perfect, expeditious, and economical manner than has been heretofore possible, and certain of the steps of the process are adapted for the reclaiming of sulphurous-acid solution already used in the manufacture of cellulose and combined with or held in suspension in steam.

Our invention consists in a certain novel process of purifying, filtering, and cooling sulphurous acid and subsequently combining such acid with water and an alkaline base for the production of a sulphite solution.

In the accompanying drawings we have illustrated an apparatus adapted to carry out the novel process which forms the subject-matter of our present invention, and we will now proceed to describe the same.

In the said drawings, Figure 1 is a vertical transverse section of the entire apparatus; Fig. 2, a cross-section of one of the cooling-pipes through which the gas passes, and Fig. 3 a plan view of the cooling apparatus.

This apparatus consists of three separate parts which are connected together by suitable pipes and operate in conjunction to produce the desired result. These parts are a filtering apparatus, an apparatus for cooling the gas, and the apparatus for the production of the solution.

In the drawings, A designates a chamber divided into two compartments by a division-wall, A', which has an opening, A², at top for the passage of the gas from one chamber to another. Near the bottom of the first chamber is arranged a grating, A³, upon top of which is placed a layer of any substance not acted upon by sulphurous acid—such as coke, broken china or earthenware, granite, or quartz—and upon top of this layer is placed a layer of limestone, upon top of the limestone a layer of the substance first used, and so on alternately until the chamber is filled up to the top of the dividing-wall A'. A pipe, $a$, leads from the bottom or near the bottom of the second chamber to the cooling apparatus. This cooling apparatus consists of a rectangular box or open tank, B, having water inlet and outlet pipes $b$ $b^4$, as shown. Within the box or tank B is placed a series of pipes, B' B' B', joined together at their ends by caps B², which are in turn connected, respectively, to the pipe $a'$, leading from the filtering apparatus, and to a pipe, $b'$, leading to the chamber or tank in which the combination of the gas with the desired base takes place. The pipes B' B' B' all communicate directly with the inlet-pipe $a'$ and outlet-pipe $b'$, and each of them is provided with small diagonal pipes $b^2 b^2$, Fig. 3, communicating at each end with the water which surrounds the pipes B' B' B' and serving to divide and mix the gas passing through the pipes B' B' B', and to afford additional cooling-surface.

One of the pipes B' is shown in section at Fig. 3 of the drawings, and its peculiar construction will be readily understood by an inspection of the figure. The tank B is kept full of water, which is constantly changing, passing into the tank at one end through the pipe $b$ and out through the other pipe, $b^4$. The gas passing through the pipes B' B', in opposite direction to the passage of the water through the tank, leaves the cooling apparatus at or about the same temperature as that of the water.

Referring now to the upper portion of the figure, which illustrates the apparatus for combining the cooled and purified sulphurous-acid gas with the desired base and liquid, it will be observed that we employ four boxes or tanks, C D E F, of similar construction. The boxes are made, preferably, of wood, and are adapted to contain the limestone, dolomite, or other alkaline base, and also the water which is employed to form the solution. Each of the boxes has a hopper, $d$, having a lid, $d'$, and a gate, $d''$, which hoppers contain a supply of the base, whence the boxes C D E F may be replenished from time to time, as required, without interrupting the continuity of the process of the formation of the solution.

Gratings $E' E^2 E^3 E^4$ are fixed near the bottom of each of the tanks C D E F, forming supplemental perforated bottoms to the same, and upon top of these gratings is placed the material which is to form the base of the solution. Beneath each of the gratings $E' E^2 E^3 E^4$ is placed a perforated coil of pipe, $F' F^2 F^3 F^4$, into which the gas is forced in succession, and from whence it passes up through the gratings.

G designates a gas-pump or other equivalent forcing and drawing apparatus, by means of which the gas is drawn and forced through the entire apparatus, as will be presently described.

We have shown the tanks C D E F as being arranged two above and two below a horizontal line, and we prefer this arrangement for the number of tanks shown; but the relative number of tanks and their arrangement may be varied to any degree without departure from the spirit of our invention. A reservoir for the reception of the solution is provided, and is connected to the bottom of the tank C by a pipe, $e$, a pump, $e'$, serving to elevate the solution to said reservoir.

The apparatus being charged with the requisite materials and the gas-pump G put in motion or operation, the gas is drawn from the pyrites-furnace or other generator into the first compartment of the chamber A, and, ascending through the limestone and coke, the flowers of sulphur, arsenic acid, &c, is deposited upon the coke or broken stone and the sulphuric acid is absorbed by the limestone, which latter remains active for a long time, as each atom of the sulphuric acid uniting with the limestone sets free one atom of carbonic acid, by reason of which the sulphate coating becomes extremely porous. After passing through the first compartment the gas, now freed from dust and sulphuric acid, passes over the division-wall A', and, descending through the second compartment, goes to the cooling apparatus through pipe $a'$. After passing through the cooling apparatus the gas emerges through the pipe $b'$. Said pipe extends up above the level of the top of the tank C, and is bent down alongside of the tank and enters the same below the grating E', and is connected to or made continuous with the perforated and coiled pipe F', so as to cause the gas to be distributed evenly throughout the tank. The gas after passing up through the alkaline earth or other substance on top of the grating E' and through the solution already in the tank passes off through a pipe, 2, which leads from the top of the tank C to the coiled pipe $F^2$ in the second tank, D. The pipe 2 before entering the tank D is led up above the level of the top of said tank and down again, so as to form a water-trap, and thereby prevent the liquid contents of said tank from passing back through the pipe, and the same arrangement is made with the other gas-pipes, 3, 4, and 5, and for the same purpose. After leaving the tank D the gas proceeds by way of a pipe, 3, to the gas-pump G, and leaving the pump G through pipe 4 enters at the bottom of the third tank, E, where it is distributed by the coil $F^3$ and arises through the grating $E^3$ and the contents of the tank E. After passing through the tank E the gas passes to the tank F through pipe 5, and after passing through the tank F in the same manner as through the other tanks, the residual gases—such as nitrogen and carbonic-acid gas—pass off into the air through a waste-pipe, 6. The water, which with the base and the gas forms the desired solution, takes the opposite course through the tanks to that of the gas entering the fourth tank, F, through a pipe, $g$. It passes down over the dolomite or other substance in the tank and through the perforated bottom or grating $E^4$, fills the tank and passes out through a pipe, $h$, which is provided with a suitable valve, $h'$, to the tank E. Entering the tank E at the top the water passes down through the same and is led from the bottom of this tank to the top of the second tank, D, by way of a diagonal pipe, $i$. Passing down through the tank D the water goes to the tank C by way of the pipe $k$, and passing through this tank it finally emerges in the form of the desired solution by way of a pipe, $e$, through which it is led to the reservoir H. Valves or cocks are provided at intervals in the water-pipes, so as to regulate the flow of the water.

It will be noted that the gas passes through each of the tanks in succession from bottom to top, and that the water pursues the opposite course. The process being a continuous one, there is no necessity for removing the alkaline earths or other substances from the tank.

When desired or deemed expedient, the contents of tanks may be removed and replaced through the hoppers $d$.

The apparatus is exceedingly simple in construction and operation, and renders easy and expeditious the economical production of the desired solution.

From the foregoing description of the construction and operation of the apparatus it will be observed that there are three principal steps in the entire process, and that these several steps are pursued in succession to accomplish the desired end. We do not, however, wish to limit ourselves to the carrying out of the entire process, as some portions of it are novel inventions capable of application to other purposes. These steps may be said to consist in, first, drawing or forcing the sulphurous-acid gas directly from the apparatus wherein it is generated and passing it through the filtering-chamber, where it is freed from arsenic acid, flowers of sulphur, and sulphuric acid; secondly, in passing the filtered and purified gas through a cooling apparatus wherein its temperature is reduced; thirdly, in passing the cooled and purified gas through a chamber where it is combined with water and an alkaline base. We can, perhaps, show more clearly the fact that each of these steps is in itself a novel and useful process by describing briefly the manner in which they may be combined with other processes or other steps in the process of manufacturing solutions of sulphurous acid. For instance, in the manufacture of sugar, where it is desired to submit the sugar-liquor to the action of sulphurous acid, the first two steps of the process may be advantageously carried out—i. e., the filtering and cooling of the sulphurous-acid gas—and the latter may then be led directly to a tank or tanks containing the sugar-liquor.

Another instance illustrating the utility of a portion of the entire process is where sulphurous acid is to be regained from steam in which it is held in suspension after it has been used in digesting wood-fiber for the manufacture of paper-pulp. In this case the filtering and cooling process, as carried on where the sulphurous acid is brought directly from the generating apparatus, is unnecessary, for the reason that the acid held in suspension in the steam is free from the sulphuric acid, &c., which accompany it when brought direct from the pyrites-furnace or other generator.

In the reclaiming process a slight modification of the apparatus is necessary. In the drawings we have shown this modification. On the left-hand side of the tank C in the drawings is a tank, K, having an inlet-pipe, $l$, and an outlet-pipe, $l'$. Said tank is formed with double sides and bottom, forming a water-space, within which is coiled a lead pipe, L, through which the mixed gas and steam pass. The space between the double walls of the tank is kept filled with water, which is constantly changing, entering at the pipe $l$ and passing out through the pipe $l'$. The gas and steam take the opposite course, entering at the top of the tank and passing out in liquid form at the bottom.

The pipe L is provided with a suitable stop-cock, $m$, by means of which communication is cut off when the reclaiming process is not being carried on. The pipe $b'$, leading from the cooling-pipes B' B' B', is provided with a stop-cock, $b^3$, as also the various pipes for the conveyance of water through the tanks C D E F.

The rationale of the process carried on by means of the above-described apparatus is as follows: The gas coming direct from the generator and passing through the limestone and broken china in the chamber A, is freed from the sulphuric acid, which combines with the limestone, forming an extremely porous sulphate coating thereon. The dry particles—such as flowers of sulphur, arsenic acid, &c.—adhere to the pieces of earthenware or coke, and the sulphurous-acid gas leaves the chamber in a pure condition. The gas now passes through the cooling-pipes B', and is reduced in temperature, so that when it comes in contact with the alkaline bases in the tanks C D E F there will be no danger of the formation of undesirable compounds. Passing through the tanks C D E F, the gas combines with the alkaline base therein and forms a salt, which is immediately dissolved in the water which passes through said tanks in opposite direction. The process may be carried on continuously by renewing the alkaline base or replenishing it from the hoppers on top of the tanks.

Where the process is confined to the reclaiming of sulphurous acid held in suspension in steam, the filtering and cooling steps in the process are dispensed with, and instead the combined gas and steam are condensed in the vessel K, the water of condensation combining with the solution in the tank C, and the sulphurous-acid gas now passing through the several tanks and combining with the bases, as before described.

Having described our invention, we claim—

1. In the manufacture of sulphites, the herein-described process of purifying sulphurous-acid gas previous to combining it with a base, consisting in passing the gas through a solid material which will combine with the sulphuric acid held in suspension in such gas.

2. In the manufacture of sulphites, the process of filtering and purifying sulphurous acid preparatory to making solutions of the same, consisting in passing the sulphurous acid through a solid material which will combine with sulphuric acid, and a solid material adapted to interrupt the passage of dry particles, and then cooling the acid, substantially as described.

In testimony that we claim the foregoing as our invention we have signed our names, in presence of two witnesses, this 20th day of January, 1885.

EUGEN BARON RITTER.
   CHARLES KELLNER.

Witnesses:
 GEORG MARTIN,
 JOHANN LUTTMANN, Jr.